Dec. 27, 1955   B. W. COLMAN   2,728,677
CONFECTION PACKAGE
Filed Aug. 5, 1954

*INVENTOR.*
Benjamin W Colman
BY

ATTORNEY

United States Patent Office 2,728,677
Patented Dec. 27, 1955

2,728,677

CONFECTION PACKAGE

Benjamin W. Colman, Berkley, Mich.

Application August 5, 1954, Serial No. 447,966

9 Claims. (Cl. 99—180)

This invention relates to a confection package, and more particularly to a sealed package in which the confection material is contained as a liquid to be frozen at a time substantially beyond that at which the package is produced.

This invention is related to the invention disclosed and claimed in my co-pending patent application entitled "Confection Package," Serial No. 444,725, filed July 21, 1954.

The confection package here disclosed embodies the invention of having the confection material, preferably as an aqueous solution of a sugary fruit syrup, enclosed in a plastic film tube or pouch, sealed at both ends. A wooden, paper or similar stick is introduced as a handle into a sheath which is sealed into the tube or pouch. The handle projects outwardly of the pouch from one end of the sheath. A tubular, as well as a solid handle may be employed.

The confection material, preferably in liquid form, is completely sealed within the pouch or utbe. The package is produced, transported and sold without refrigeration, the confection material being of a type or types, well known in the art, that have a high resistance to decomposition, deterioration and spoilage at room temperatures.

The confection package of this invention is designed to be produced, transported and sold at normal room temperatures. When the consumer purchases the package at the store, it is taken home and stored until used. To use the package, it is simply placed in the freezing section of a refrigerator and frozen solid. The aqueous solution freezes about the stick within the sheath, making it a handle for the confection. When desired for consumption, the plastic film is stripped down from the frozen confection, the handle serving to support it upright.

At the present time, the frozen confections sold by street trucks or in stores are of a type that are produced, transported and sold in refrigerated condition, a method that requires costly refrigerating equipment and storage facilities. When sold through street trucks, children are subject to street traffic accidents, which should be avoided as much as possible. Another objection to street selling of the frozen confections is that the sales seem to take place just before or at meal times. This interference with the eating habits of the children raises a serious problem for some mothers.

Polyethylene is the preferred plastic material; the handle is preferably a wooden stick; and the handle sheath is preferably of polyethylene material.

The objects of the invention are directed toward providing a non-refrigerated sealed liquid confection package which can be frozen at a time when it is desired for consumption; the provision of a strippable confection film package which completely seals in the confection material; the provision of a stick handle for a frozen package, one end of the handle being encased in a sheath that is sealed in the film pouch, the other end projecting outwardly of the package; and the provision of a liquid confection to be made and sold in packaged condition at normal room temperature and to be used in frozen form after refrigeration of the entire sealed package by the consumer.

Additional objects of the invention and features of construction will become more apparent from the description given below. Referring now to the drawing annexed hereto and forming an integral part of this specification, Fig. 1 is a front elevational view of the inventive confection package here disclosed.

Figure 1:
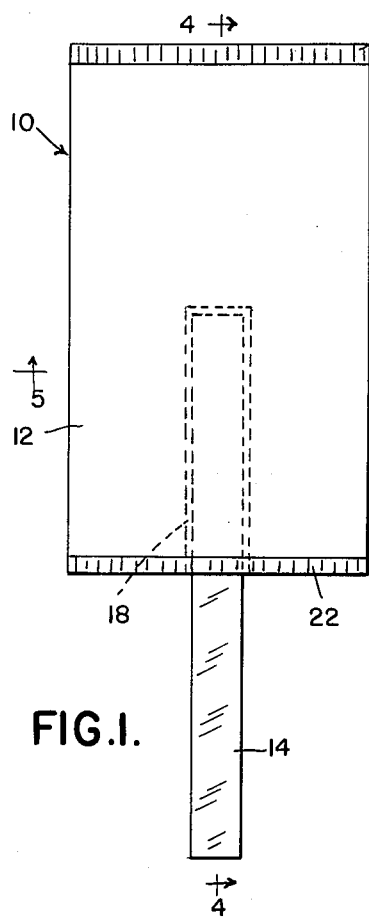
Figure 4:
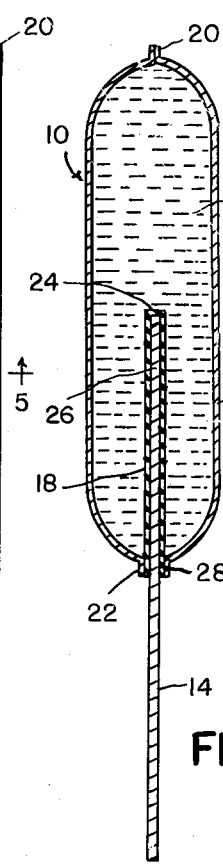
Fig. 4 is a vertical sectional view on the line 4—4 of Fig. 1.
Figure 3:
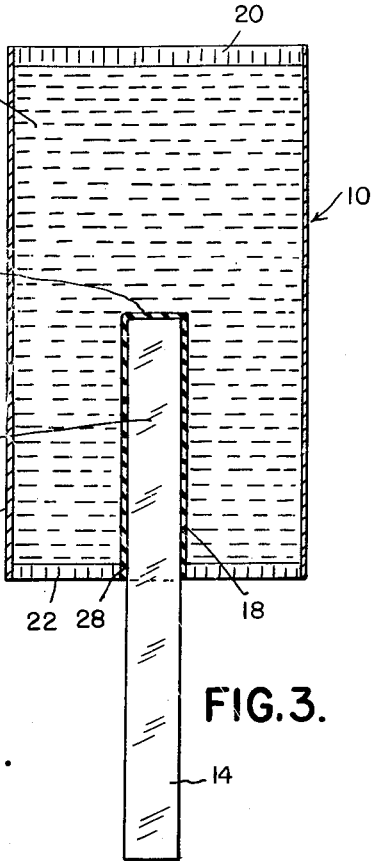
Fig. 3 is a vertical sectional view on the line 3—3 of Fig. 2.
Figure 2:
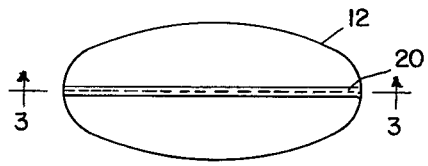
Fig. 2 is a top plan view of the confection package of Fig. 1.
Figure 6:
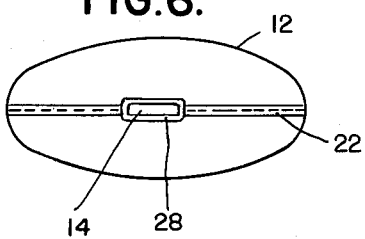
Fig. 6 is a bottom plan view of the confection package of Fig. 1.
Figure 5:
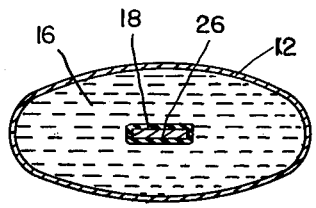
Fig. 5 is a horizontal sectional view on the line 5—5 of Fig. 1.

As shown in the several views of the drawing, the novel and inventive confection package structure 10 comprises a liquid filled film type pouch 12, a handle 14 in stick form, a freezable confection material 16, and a handle sheath 18.

The pouch 12, of tubular form, preferably of a liquid impervious material such as polyethylene, either alone or laminated with cellophane or other backing materials, is arranged with a top heat sealed portion 20 and a bottom heat sealed portion 22.

Sealing of the pouch ends 20 and 22 may be done by thermal impulse heat sealers or hot bar sealers, or such other equipment as is recommended by the film producers. At the present time, heat sealing equipment is readily available and well known in the art. Heat sealing comprises heating the film interfaces to a plastic or molten condition, pressing the film layers into firm contact at the melting temperature, and then cooling the conjoined material.

The handle 14 is preferably in the form of a wooden stick, part of which is insertable into sheath 18, made of polyethylene. Sheath 18 may be extruded tubing closed at its top portion 24, to contain and support the inserted end 26 of handle 14, or it may be molded in the sheath form shown to provide a pocket for handle portion 26. Of course, handle 14 may be tubular in form, as well as solid. Sheath 18, however, should conform more or less closely to the dimensional form of handle 14 in order that it be practical, economical and efficient to sheath handle end 26, in both normal and frozen conditions.

The handle sheath 18 is heat sealed to the pouch portion 22, leaving lower end 28 of the sheath open for insertion of the handle stick 14. The sheath 18 thus is arranged as a pocket insert in the pouch 12.

The confection material 16 is a sugary aqueous solution of a fruit syrup. Other liquid freezable material may also be used in the package 10. However, the invention is not to be considered as limited to any particular liquid material.

Such materials as are flowable into pouch 12 may be embodied in the package structure 10. These materials may be viscous in character to a greater or lesser degree; they may be semi-solid or semi-fluid in character. One example of this type of material is a smooth confection fudge which is flowable at or slightly above normal room temperature and which can be frozen solid upon handle 14.

The confection package structure 10 provides for a confection liquid filled pouch 12, closed at its top and bottom ends, and arranged with a handle sheath 18 sealed at its bottom portion 22, in to which sheath a handle stick 14 can be inserted. The package 10 is put into use by placing the package, preferably with handle stick 14 inserted in sheath 18, into the freezing compartment of a refrigerator. When the confection material 16 has frozen and solidified, the package 10 is removed from the freezing compartment. The polyethylene film is stripped from the frozen confection material and the confection is ready to be consumed. Since the pouch film is heat sealed and conjoined to the sheath 18, the latter being substantially frozen to and held in the confection liquid, the outer pouch film serves as a catch basin for drippings from the confection material.

Polyethylene film tubing provides a means of sealing an edible confection material therein so that it can be shipped and stored at room temperatures for a considerable period of time without deterioration. This is not possible where paper is used as the container. Paper will not hermetically seal a confection liquid. Paper is difficult to handle, it is delicate and subject to rupture easily, and altogether an improper container material for liquids, although much used. Polyethylene has flexibility, it is tough, it is easily sealed to provide a closed liquid-tight container, it will withstand rough handling, shock and distortion without rupture, and it meets the requirements of prevailing food and drug laws.

The confection package 10 provides for a handle stick or tube 14 which is slipped into its sheath 18, the sheath being heat sealed to the pouch 12. This structure permits heat sealing the sheath independently of the handle stick 14, or optionally with the handle 14 inserted in sheath 18 at the time it is sealed into pouch 12. Further, the sheath 18 may fit snugly as shown, or loosely about the stick 14. And the stick may be inserted into the sheath 18 at any time prior to the freezing step. If it should be left out of its sheath at the time the confection material is frozen in pouch 12, it would be difficult to squeeze it into the compressed sheath 18, and therefore it is recommended that the handle end portion 26 be slipped into sheath 18 up to its end 24 prior to freezing.

Having described my invention in its simplest terms, it is to be understood that the details of construction may be changed and varied in greater or lesser degree without departing from the essence of the invention or from the scope of the appended claims.

I claim:

1. A confection package comprising a polyethylene film pouch, a confection liquid suitable for freezing contained and sealed within said pouch, a handle for said confection liquid when frozen, and a heat sealable film sheath for said handle sealed within said pouch at one end thereof and immersed in said liquid, said sheath being open at its lowermost end adjacent said pouch end, said handle having a portion inserted into said sheath and a portion projecting from said pouch.

2. A confection package comprising a heat sealable film pouch, formed of a material selected from the group consisting of heat sealable polyethylene film and cellophane-polyethylene laminated film, a freezable confection material contained and sealed within said pouch, a handle for said confection material when frozen, and a film sheath for a portion of said handle sealed within said pouch at one end thereof and immersed in said material, said sheath being open at its lowermost end adjacent said pouch end, said handle having a portion thereof inserted into said sheath and a portion projecting from said pouch.

3. A confection package comprising a heat sealed polyethylene pouch, a confection liquid suitable for freezing contained and sealed in said pouch, a handle for said confection liquid when frozen, and a sheath for a portion of said handle sealed within said pouch at one end thereof and immersed in said liquid, said sheath being open at its lowermost end adjacent said pouch end, said handle having a portion thereof inserted into said sheath and a portion projecting from said pouch.

4. A confection package comprising a heat sealed cellophane polyethylene laminated container, a freezable confection liquid contained and sealed in said container, a handle for said confection liquid when frozen, and a sheath for said handle sealed within said container at one end thereof and immersed in said liquid, said sheath being open at its lowermost end adjacent said container end, said handle having a portion thereof inserted into said sheath and a portion projecting from said container.

5. The package structure defined in claim 4, in which said handle is in the form of a solid stick adapted to slip into said sheath.

6. The package structure defined in claim 4, in which said handle is in the form of tube adapted to slip into said sheath.

7. A liquid confection package comprising a heat sealable polyethylene film pouch, an aqueous solution of a fruit syrup type confection liquid suitable for freezing contained and sealed in said pouch, a handle for said confection liquid when frozen, and a sheath for said handle sealed within said pouch at one end thereof and immersed in said liquid, said sheath being open at its lowermost end adjacent said pouch end, said handle having a portion thereof inserted into said sheath and a portion projecting from said pouch.

8. A confection package comprising a heat sealable polyethylene container, a confection material in a viscous state suitable for freezing sealed in said container, a handle for said confection material when frozen, and a sheath for said handle sealed within said container at one end thereof and immersed in said material, said sheath being open at its lowermost end adjacent said container end, said handle having a portion thereof inserted into said sheath and a portion projecting from said container.

9. A confection package comprising a heat sealable polyethylene film pouch, a freezable confection material in a semi-fluid state sealed in said pouch, a handle for said confection material when frozen, and a sheath for said handle sealed within said pouch at one end thereof and immersed in said material, said sheath being open at its lowermost end adjacent said pouch end, said handle having a portion thereof inserted into said sheath and a portion projecting from said pouch.

References Cited in the file of this patent

UNITED STATES PATENTS

| | | |
|---|---|---|
| 1,786,606 | Gordon | Dec. 30, 1930 |
| 1,882,290 | Meagher | Oct. 11, 1932 |
| 1,947,010 | Jones | Feb. 13, 1934 |
| 2,450,364 | Smith | Sept. 28, 1948 |
| 2,631,939 | Peters | Mar. 17, 1953 |

OTHER REFERENCES

"Refrigerating Engineering," February 1954, page 46, article entitled "Packaging and Wrapping Materials."